US010956532B2

United States Patent
Cui (10) Patent No.: US 10,956,532 B2
(45) Date of Patent: Mar. 23, 2021

(54) METHOD AND APPARATUS FOR DISPLAYING PAGE TO USER THROUGH REINFORCEMENT LEARNING

(71) Applicant: Advanced New Technologies Co., Ltd., Grand Cayman (KY)

(72) Inventor: Qing Cui, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/795,091

(22) Filed: Feb. 19, 2020

(65) Prior Publication Data

US 2020/0265105 A1 Aug. 20, 2020

(30) Foreign Application Priority Data

Feb. 20, 2019 (CN) .......................... 201910127332.9

(51) Int. Cl.
*G06F 3/048* (2013.01)
*G06F 16/957* (2019.01)
(Continued)

(52) U.S. Cl.
CPC ........ *G06F 16/9577* (2019.01); *G06F 16/986* (2019.01); *G06K 9/6263* (2013.01); *G06N 3/04* (2013.01); *G06N 7/00* (2013.01)

(58) Field of Classification Search
CPC . G06F 16/9577; G06F 16/986; G06K 9/6263; G06N 3/04; G06N 7/00
(Continued)

(56) References Cited

U.S. PATENT DOCUMENTS 8,250,012 B1 * 8/2012 Whitman ............... G06Q 30/02
706/45
8,510,237 B2 8/2013 Cascaval et al.
(Continued)

FOREIGN PATENT DOCUMENTS

AU 2012272850 1/2014
CN 101751437 6/2010
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — David Phantana-angkool
(74) *Attorney, Agent, or Firm* — Fish & Richardson P.C.

(57) ABSTRACT

Implementations of this specification provide a method and an apparatus for obtaining a display policy through reinforcement learning techniques. The display policy can be used to select particular page layouts to present to a user. The method includes the following: obtaining user features of a first user in response to a request for accessing a first page by the first user; selecting, according to a display policy and based on the user features, a first page layout from a first plurality of candidate page layouts; displaying the first page to the first user with the first page layout; obtaining operation information of the first user on the first page with the first page layout, and determining a reward score for current page display based on the operation information; and updating the display policy for displaying pages by using a reinforcement learning algorithm based at least on the reward score.

19 Claims, 4 Drawing Sheets

(51) Int. Cl.
*G06F 16/958* (2019.01)
*G06K 9/62* (2006.01)
*G06N 3/04* (2006.01)
*G06N 7/00* (2006.01)

(58) Field of Classification Search
USPC .......................................................... 715/765
See application file for complete search history.

(56) References Cited

U.S. PATENT DOCUMENTS

| | | | |
|---|---|---|---|
| 9,244,917 B1* | 1/2016 | Sharma | G06F 16/9577 |
| 9,489,349 B2* | 11/2016 | Ying | G06F 40/186 |
| 10,437,913 B2* | 10/2019 | Ying | G06F 40/106 |
| 10,621,270 B2* | 4/2020 | Monroe | G06F 3/0482 |
| 2009/0271263 A1* | 10/2009 | Regmi | G06Q 30/0222 |
| | | | 705/14.17 |
| 2013/0332523 A1 | 12/2013 | Luu | |
| 2014/0075293 A1 | 3/2014 | Makeev et al. | |
| 2015/0019545 A1* | 1/2015 | Chedeau | G06Q 50/01 |
| | | | 707/725 |
| 2015/0019943 A1* | 1/2015 | Ying | G06F 40/186 |
| | | | 715/204 |
| 2015/0095768 A1* | 4/2015 | Rimmer | G06F 40/103 |
| | | | 715/238 |
| 2018/0032626 A1 | 2/2018 | Be-Aharon | |
| 2018/0144385 A1* | 5/2018 | Subramanya | G06Q 30/0627 |
| 2018/0210864 A1 | 7/2018 | Zhang | |
| 2018/0374138 A1* | 12/2018 | Mohamed | G06N 20/00 |

FOREIGN PATENT DOCUMENTS

| | | |
|---|---|---|
| CN | 104536768 | 4/2015 |
| CN | 106056213 | 10/2016 |
| CN | 107817898 | 3/2018 |
| CN | 108780378 | 11/2018 |
| CN | 108829808 | 11/2018 |
| CN | 109003143 | 12/2018 |
| CN | 109154948 | 1/2019 |
| CN | 109255648 | 1/2019 |
| CN | 109324862 | 2/2019 |
| TW | 201520790 | 6/2015 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Application No. PCT/US2020/016505, dated Apr. 20, 2020, 13 pages.

* cited by examiner

METHOD AND APPARATUS FOR DISPLAYING PAGE TO USER THROUGH REINFORCEMENT LEARNING

CROSS-REFERENCE TO RELATED APPLICATIONS

This application claims priority to Chinese Patent Application No. 201910127332.9, filed on Feb. 20, 2019, which is hereby incorporated by reference in its entirety.

TECHNICAL FIELD

One or more implementations of this specification relate to the field of machine learning, and in particular, to a method and an apparatus for displaying a page to a user through reinforcement learning.

BACKGROUND

In the information age, various information is displayed to users through pages. For example, various information can be displayed to users through web pages, and various APPs are also displayed to users through application pages, for example, a merchandise recommendation page of mobile phone client software of TAOBAO. How to display pages to best satisfy users' demands is an important problem.

Usually, a dedicated product manager or designer designs a page, and determines a method of displaying the page. However, this solution relies heavily on the experience of the product manager or designer, has high labor costs, and may deviate from user's demands in product design. In addition, the AB test is sometimes used to determine a display solution. However, as such, a page display solution favored by most people can be selected, which cannot show a diversity of display methods, and cannot satisfy demands of different users to a maximum extent.

Therefore, an improved solution is desired for determining the most suitable page display methods for different users to satisfy users' demands and improve user experience. P

SUMMARY

One or more implementations of this specification describe a method and an apparatus for displaying a page to a user. According to the method in the implementations, a corresponding page layout is determined based on user features of a user by using a display policy through reinforcement learning. As such, a suitable page display method is provided for the user.

According to a first aspect, a method for displaying a page to a user through reinforcement learning is provided, including the following: obtaining user features of a first user in response to a request for accessing a first page by the first user, where the user features include one or more user profile features and one or more user context features, mapping, based on a display policy, the user features to a first page layout in a first plurality of candidate page layouts generated for the first page, displaying the first page to the first user with the first page layout, obtaining operation information of the first user on the first page with the first page layout, and determining a reward score for current page display based on the operation information, and updating the display policy for displaying pages by using a reinforcement learning algorithm based at least on the reward score.

In an implementation, the user profile features include at least one of the following: age, gender, registration duration, education level, occupation, and user tag, and the user context features include at least one of the following: time when the request is sent, an interface that the request is sent through, or operation track information of the user.

According to an implementation, the previous first plurality of candidate page layouts are generated in advance in the following way: determining candidate page display methods, determining a candidate method of arranging page elements on the first page, determining candidate attributes of the page elements, and combining the page display methods, the candidate arrangement method, and the candidate attributes to generate the first plurality of candidate page layouts.

More specifically, in an implementation, the candidate page display methods include waterfall display and page turning display, and the candidate attributes include display sizes, display shapes, and resolution of the page elements.

In an implementation, the display policy includes an initial policy, and correspondingly, the mapping the user features to a first page layout in a plurality of page layouts that is generated in advance for the first page includes the following: randomly assigning a first traffic bucket in a first plurality of traffic buckets to the first user, where the first plurality of traffic buckets correspond to the first plurality of candidate page layouts, and using a candidate page layout corresponding to the first traffic bucket as the first page layout.

According to different implementations, the display policy can be implemented by one of a logistic regression model, a gradient boosting decision tree GBDT model, and a deep neural network.

In an implementation, the previous operation information includes at least one of the following: hit count on the page, page view, view depth to the page, and time on the page, and correspondingly, the reward score can be determined as a weighted sum of at least one of the previous operation information.

In an implementation, the operation information includes a transaction amount achieved based on the first page, and correspondingly, the reward score can be determined to be directly proportional to the transaction amount.

According to an implementation, the updating the display policy for displaying pages by using a reinforcement learning algorithm based at least on the reward score includes the following: adding the user features, the first page layout, and the reward score to a training sample set as one training sample, and updating the display policy for displaying pages by using the training sample set through the reinforcement learning algorithm.

In different implementations, the reinforcement learning algorithm can be one of the following: an evolution strategy algorithm, a Q-learning algorithm, a SARSA algorithm, a policy gradient algorithm, and a cross information entropy method.

According to a second aspect, an apparatus for displaying a page to a user through reinforcement learning is provided, including the following: a feature acquisition unit, configured to obtain user features of a first user in response to a request for accessing a first page by the first user, where the user features include one or more user profile features and one or more user context features, a layout determining unit, configured to map, based on a display policy, the user features to a first page layout in a first plurality of candidate page layouts generated for the first page, a display unit, configured to display the first page to the first user with the first page layout, a feedback acquisition unit, configured to obtain operation information of the first user on the first page with the first page layout, and determine a reward score for current page display based on the operation information, and an update unit, configured to update the display policy by using a reinforcement learning algorithm based at least on the reward score to perform next page display.

According to a third aspect, a computer-readable storage medium is provided, a computer program is stored on the computer-readable storage medium, and when the computer program is executed in a computer, the computer performs the method in the first aspect.

According to a fourth aspect, a computing device is provided, including a memory and a processor, where the memory stores executable code, and when executing the executable code, the processor performs the method in the first aspect.

According to the method and the apparatus provided in the implementations of this specification, a page display policy can be learned through policy exploration and policy update in reinforcement learning without labeling. In the page display policy, the most suitable page display methods can be determined for different users. As such, a diversity of page display methods are shown, the personalized demands of users are satisfied, and the use experience of users is improved.

BRIEF DESCRIPTION OF DRAWINGS

To describe the technical solutions in the implementations of the present disclosure more clearly, the following briefly describes the accompanying drawings for describing the implementations. Apparently, the accompanying drawings in the following description show merely some implementations of the present disclosure, and a person of ordinary skill in the art can derive other drawings from these accompanying drawings without creative efforts.

DESCRIPTION OF IMPLEMENTATIONS

The following describes the solution provided in this specification with reference to the accompanying drawings.

To perform personalized and targeted page display for different users, according to the implementations of this specification, the concept and the method of reinforcement learning are used to determine suitable page display solutions for the users. As known by a person skilled in the art, reinforcement learning is an unlabeled learning method that is based on sequence behavior feedbacks and is policy learning performed through continuous "trials and errors".

Figure 1:
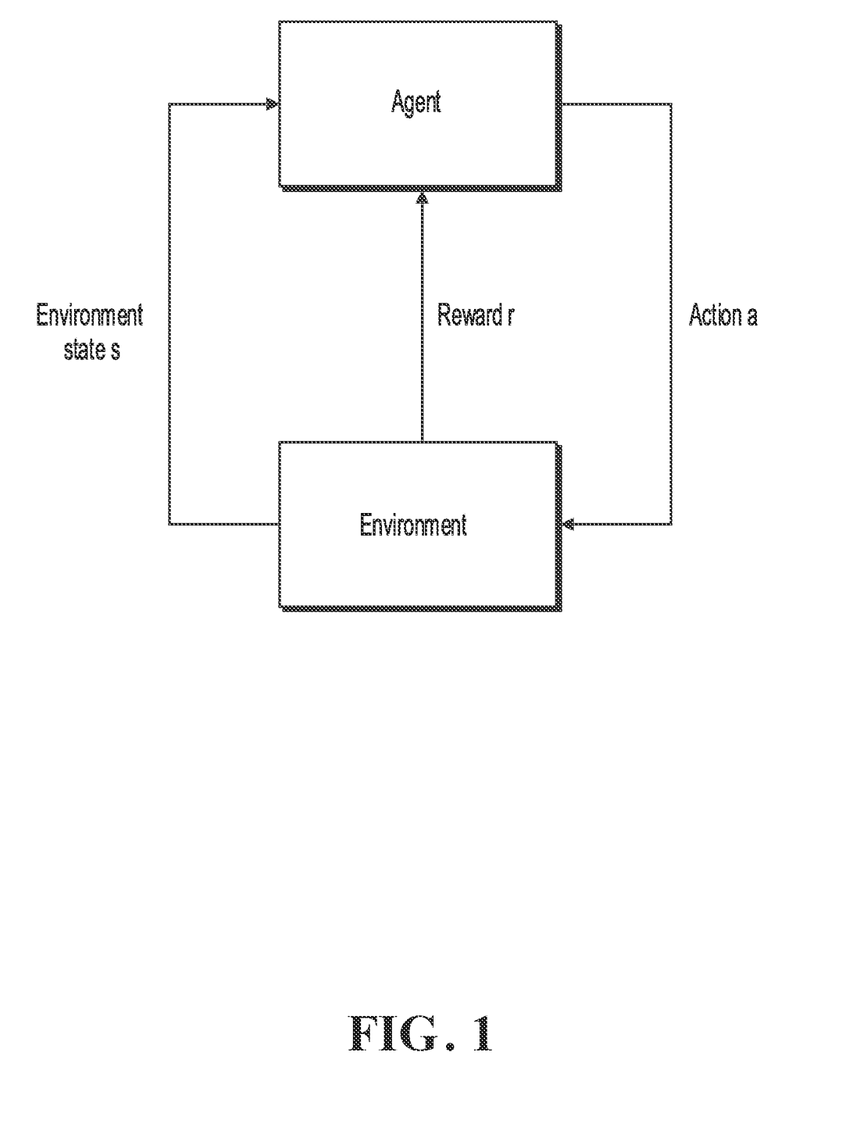
FIG. 1 is a schematic diagram illustrating a typical reinforcement learning system.

FIG. 1 is a schematic diagram illustrating a typical reinforcement learning system. As shown in FIG. 1, usually, the reinforcement learning system includes an agent and an execution environment. The agent continuously learns and improves a policy of the agent by interacting with and feeding back to the execution environment. Specifically, the agent observes and obtains a state (state) of the execution environment, and determines, based on a specific policy, a behavior or an action (action) to be taken for the state of the current execution environment. When such a behavior acts on the execution environment, the state of the execution environment can be changed, and a feedback is generated to the agent at the same time. The feedback is also referred to as reward score (reward). The agent determines, based on the obtained reward score, whether the previous behavior is correct and whether the policy needs to be adjusted to further update the policy of the agent. By repeatedly observing states, determining actions, and receiving feedbacks, the agent can repeatedly update the policy, and the ultimate objective of the agent is to learn a policy so that the obtained cumulative reward score is maximized.

Figure 2:
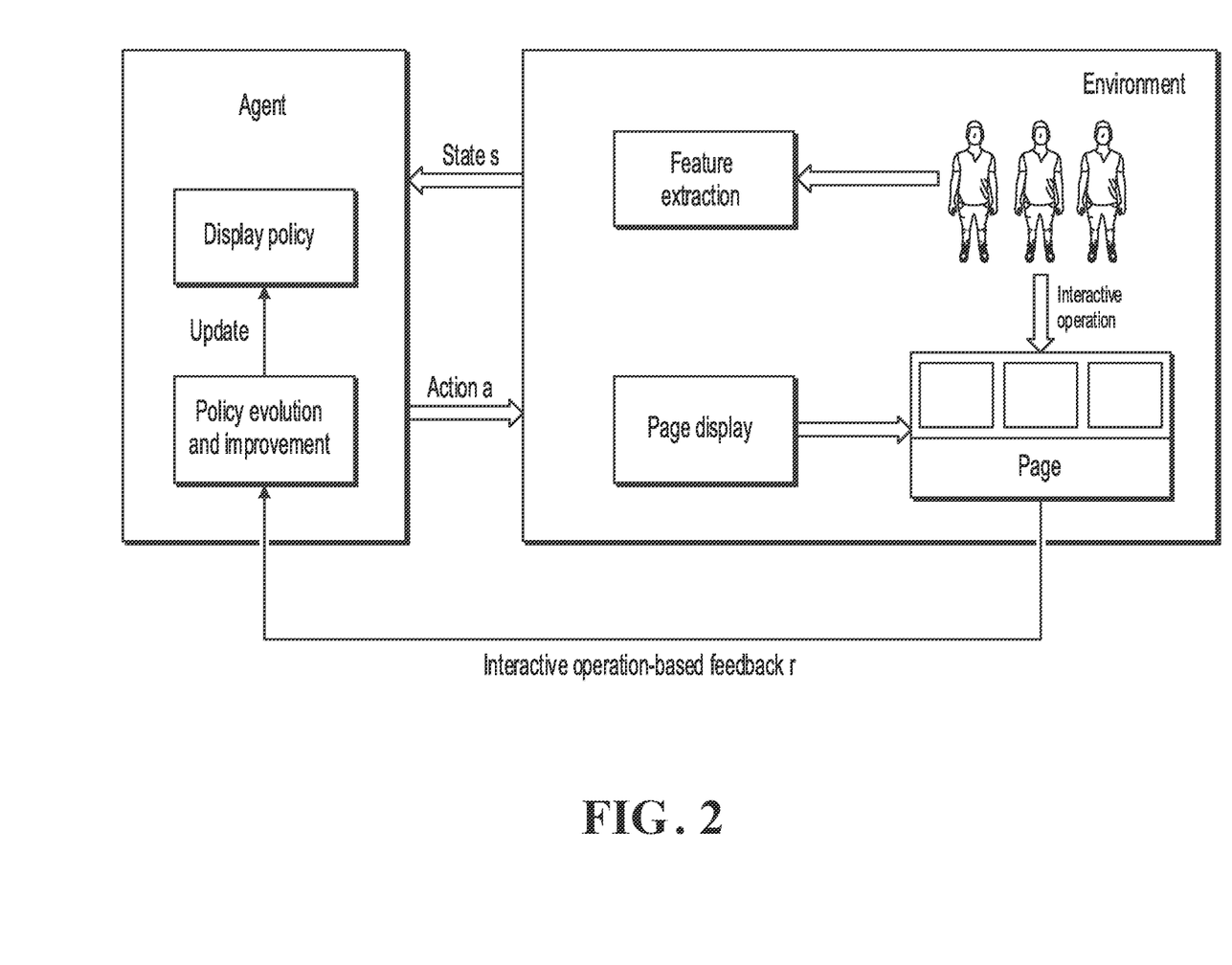
FIG. 2 is a schematic diagram illustrating an implementation scenario of an implementation disclosed in this specification.

FIG. 2 is a schematic diagram illustrating an implementation scenario of an implementation disclosed in this specification. According to one or more implementations of this specification, in the concept of reinforcement learning, when a user requests to access a page, a related feature of the user is extracted (which is equivalent to obtaining state s of an execution environment), and a specific display policy is used to determine a page layout suitable for the user for display (which is equivalent to determining action a to be taken). Then, the interaction and operation information of the user on the page is used as reward score r for feedback, and is used as a learning sample to update a display policy. In such repeated learning, the display policy is improved by repeated explorations and "trials and errors". Therefore, the improved display policy can be used to determine the most suitable page display methods for different users.

The following describes a specific implementation method of the previous concept.

Figure 3:
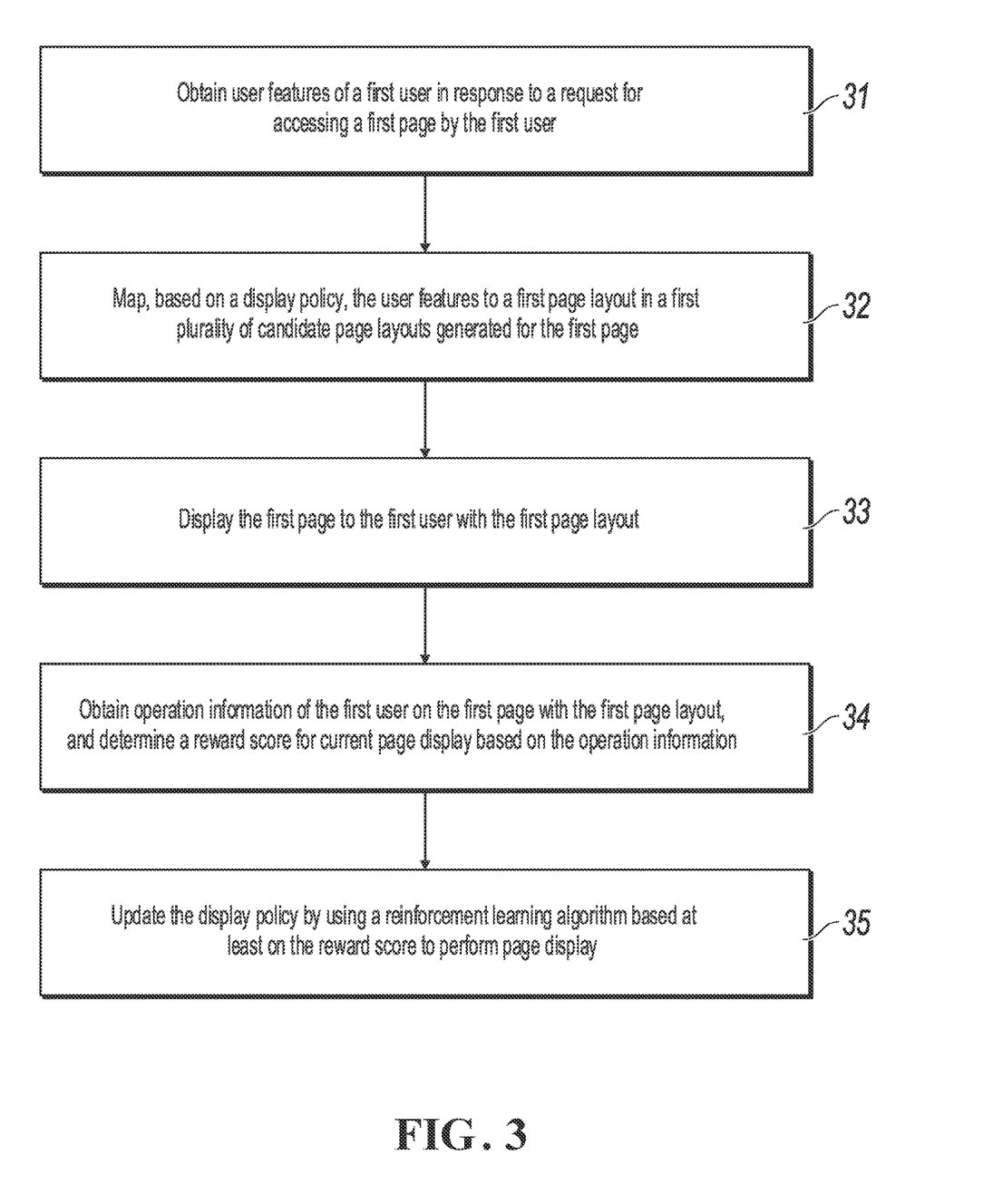
FIG. 3 is a flowchart illustrating a method for displaying a page to a user, according to an implementation.

FIG. 3 is a flowchart illustrating a method for displaying a page to a user, according to an implementation. It can be understood that the method can be performed by any apparatus, device, platform, or a device cluster that has computing and processing capabilities. As shown in FIG. 3, the method includes the following: Step 31: Obtain user features of a first user in response to a request for accessing a first page by the first user, where the user features include one or more user profile features and one or more user context features. Step 32: Map, based on a display policy, the user features to a first page layout in a first plurality of candidate page layouts generated for the first page. Step 33: Display the first page to the first user with the first page layout. Step 34: Obtain operation information of the first user on the first page with the first page layout, and determine a reward score for current page display based on the operation information. Step 35: Update the display policy by using a reinforcement learning algorithm based at least on the reward score to perform page display. The following describes specific execution of the previous steps.

First, in step 31, the user features of the first user are obtained in response to the request for accessing the first page by the first user. It should be understood that the first user here means any specific user. The first page can be any page. For example, the first page can be a web page, or can be an APP page. More specifically, in an example, the first page is the homepage or the merchandise recommendation page of the TMALL APP.

As such, when the first user requests to access the first page, the user features of the first user are obtained. The user features can include user profile features. In an implementation, the user profile features can include basic attribute features of the user, such as age, gender, registration duration, education level, and occupation.

In an implementation, the user profile features can further include a user tag that can directly reflect a feature of the user. Usually, the user tag can be determined based on user attribute features and historical big data of users. There are a plurality of solutions of classifying users as crowds. In these solutions, user tags are added to users in various ways such as clustering and grouping, for example, "workplace newbie" and "full-time housewife". In step 31, various known crowd classification solutions can be used to obtain the previous user tag. Alternatively, tags can be added to users by using various crowd classification solutions in advance. In step 31, a user tag of the user is read.

The user features can further include user context features. In an implementation, the user context features can include time when the page request is sent, such as the morning, the working time, or the evening. The user context features can further include an interface that the page request is sent through, for example, a page or a link used by the user to send the current page request. The user context features can further include operation track information of the user, that is, operations that are performed by the user before the page request is sent, for example, historical pages that are accessed, or operations (click, zoom-in, zoom-out, and input) that are performed on the historical pages.

The previously obtained user features are equivalent to current state s of an execution environment in the reinforcement learning system. Then, action a to be taken in current state s needs to be determined based on a policy. Therefore, in step 32, the previous user features are mapped based on the display policy to the first page layout in N candidate page layouts generated for the first page.

The previous N candidate page layouts for the first page can be generated in advance in a plurality of ways.

In an implementation, candidate page display methods are determined for the first page in advance. Specifically, for the APP page, the candidate page display methods can include waterfall display and page turning display. For the web page, the candidate page display methods can include single-page display, drop-down display, etc.

In addition, a candidate method of arranging page elements on the first page is further determined. For example, the page elements are displayed in several rows, and several elements are displayed in each row. Candidate attributes of the page elements can be further determined. These candidate attributes include display sizes, display shapes, resolution, etc. of the page elements.

A plurality of candidate page layouts can be generated by combining the previous page display methods, the candidate arrangement method of the page elements, and the candidate attributes.

In addition, in some implementations, more factors related to page display can be further selected, such as a background color of the page, a font style of the page, and screen brightness of the page. By further selecting the previous factors, further modification and adjustment are performed on the page layout to obtain more candidate page layouts.

More specifically, assume that the first page is a merchandise recommendation page of an e-commerce APP (for example, TMALL in a mobile phone), and page elements on the first page are merchandises to be displayed. Then, two different page display methods (waterfall and page turning display), m different merchandise arrangement ways (for example, four merchandises in each row or three merchandises in each row), and k merchandise attribute selections (for example, sizes, shapes, and resolution of a merchandise picture) can be combined to obtain N=2*m*k candidate page layouts.

In another implementation, a designer can design a plurality of candidate page layouts in advance based on different crowd and different styles, as the previous N candidate page layouts.

The previous N candidate page layouts generated in advance are equivalent to N candidate actions, that is, N-dimensional action space is generated. Correspondingly, the display policy in step 32 is used to select an appropriate action, that is, an appropriate page layout from the N-dimensional action space based on the user features. In other words, the display policy is equivalent to a mapping function, and the mapping function is used to map the user features to one of the N candidate page layouts, which is referred to as a first page layout below.

In an implementation, the previous mapping function can be implemented by using an N-classification algorithm, and each classification corresponds to one candidate page layout. As such, in the display policy, the user is classified into one of the N classifications based on the previous user features, and therefore a corresponding candidate page layout is determined.

According to different implementations, the previous display policy can be implemented by using various machine learning models, for example, a logistic regression model, a gradient boosting decision tree GBDT model, and a deep neural network.

Initially, the display policy can be a random policy, and a current candidate page layout suitable for the first user is determined randomly. Specifically, in an implementation, online traffic is divided into N traffic buckets, and the N traffic buckets correspond to N candidate page layouts. Therefore, a certain traffic bucket in the N traffic buckets can be randomly assigned to the current first user and is denoted as a first traffic bucket. Correspondingly, a candidate page layout corresponding to the first traffic bucket can be used as the first page layout selected for the first user.

Certainly, the previous random policy is a temporary policy in initial "trial and error" and policy exploration processes. The display policy is continuously improved, updated, and adjusted through user feedbacks, which is further described later.

After the corresponding first page layout is determined for the first user in step 32, the first page is displayed to the first user with the first page layout in step 33. This is equivalent to sending execution action a to the execution environment.

Then, in step 34, the operation information of the first user on the first page with the first page layout is obtained, and a reward score for current page display is determined based on the operation information.

It can be understood that the reward score in reinforcement learning is a measurement of whether the previously performed action a is correct, and is also a main basis for subsequent policy adjustment. The objective of the policy adjustment is to maximize the cumulative reward scores obtained by performing action a. In a page display scenario, the objective of the policy training is to enable the page layout determined by the display policy to achieve a maximum user satisfaction degree, and/or enable the page platform to obtain maximum benefits by using the page. Therefore, the reward score can be set to represent, by using an operation behavior of the user on the page, the satisfaction degree of the user on the page and/or the benefits of the page platform.

Specifically, after the first page of the first page layout is returned to the first user, in an implementation, one or more of the following operation information of the first user on the first page can be obtained: hit count a1 on the page, view depth a2 to the page, page view a3, time a4 on the page, etc. It can be assumed that the previous operation information has a positive correlation with the satisfaction degree of the user, because when the user is not satisfied with the page layout of the first page, the user tends to leave the page or abandon the operation.

Therefore, in an implementation, the reward score for current page display is determined as a weighted sum of at least one of the previous operation information. For example, the reward score is determined as:

$$R = w1*a1 + w4*a4 \quad (1)$$

w1 and w4 are weight factors.

In an implementation, the previous first page is a page related to a transaction, such as an e-commerce APP page. In this case, the following operation information of the user can be obtained: transaction amount TX achieved based on the first page, for example, a purchase amount. On this basis, reward score R for current page display can be determined to be directly proportional to transaction amount TX, that is, $$R = W*TX \quad (2)$$

In an implementation, ways of determining the previous reward score can be further combined to obtain more specific representation ways of the reward score.

For example, the reward score can be determined as:

$$R = w1*a1 + W*TX \quad (3)$$

That is, the reward score is a weighted sum of hit count a1 of the user on the first page and the transaction amount.

As such, operation information of the user on the first page is obtained, and a reward score is determined based on the operation information of the user as feedback information for current page display.

Then, in step 35, the display policy is updated by using a reinforcement learning algorithm based at least on the reward score to perform page display. According to the concept of policy update in reinforcement learning, in this implementation of this specification, the display policy is repeatedly updated based on feedback information (that is, a reward score), and the objective of the update is to enable the page layout (action a) determined by the display policy for the same user feature (environment state s) to obtain more expected cumulative reward scores.

To achieve such an objective, in an implementation, a policy update is performed every time a reward score of a user is obtained. For example, a SARSA algorithm can be used to directly perform an action selection based on the current display policy, and then the current action selection is used as a sample to update the current policy.

In a more common case, feedback information of a plurality of users for a plurality of page layouts is collected as a training sample set, and a display policy is trained by using the training sample set to update the display policy.

Specifically, for the previous first user, after the first user performs an operation on the first page of the first page layout to obtain a reward score for current page display, the user features (equivalent to environment state s) of the first user, the first page layout (equivalent to action a), and the reward score (r) are added to the training sample set as one training sample. As such, the training sample set includes a plurality of training samples in a form of <s, a, r>. In an implementation, in a continuous-interaction scenario, a new user feature (where the user profile feature does not change, but the context feature can change) is further obtained after the first user performs an operation on the first page layout. This is equivalent to obtaining new state s' that an execution environment is transferred into after action a is performed. As such, a training sample in the form of <s, a, r, s'> is generated.

Then, the display policy is updated by using the training sample set through the reinforcement learning algorithm. According to different implementations, a plurality of reinforcement learning algorithms can be used for training. These reinforcement learning algorithms include an evolution strategy algorithm, a Q-learning algorithm, a policy gradient algorithm, a cross information entropy method, etc.

The following describes an update process of a display policy with reference to a typical Q-learning algorithm.

The update of the display policy can include evaluation of the policy and improvement of the policy. In the Q-learning algorithm, the state-action value function (state-action value function) Q is used to represent an expected cumulative reward. The state-action value function is also referred to as a Q function, where Q(s, a) represents the cumulative reward score brought by using policy π after action a is performed from state s. The value of the Q function is referred to as a Q value. The cumulative reward score can be calculated in the form of T-step cumulative reward or γ-discount cumulative reward. The expressions of the Q function in these two forms are as follows:

$$\begin{cases} Q_T^\pi(s, a) = E_\pi\left[\dfrac{1}{T}\sum_{t=1}^T r_t\right] \\ Q_\gamma^\pi(s, a) = E_\pi\left[\sum_{t=0}^\infty \gamma^t r_{t+1}\right] \end{cases}.$$

The subscript t represents a quantity of subsequent steps to be performed, and $r_t$ is a reward score for t steps.

As described above, a plurality of training samples in the form of <s, a, r, s'> are collected. By using these training samples, reward scores r obtained after different actions a are applied in different states s can be determined. Further, it is learned that Q values are correspondingly obtained by applying different actions a in different states s.

During a policy update, if a greedy algorithm is used, the following display policy can be obtained: For state s formed by current user features, respective Q values for displaying N candidate page layouts (that is, N different actions are applied) in state s are determined, and a page layout corresponding to a maximum Q value in the N Q values is selected as a display layout.

A policy gradient algorithm uses different policy evaluation and update ways. In the algorithm, learning and evaluation of Q functions are not involved. Instead, a gradient of policy parameter adjustment is directly determined for a display policy with smaller loss, and the policy is adjusted based on the determined gradient.

Other reinforcement learning algorithms are not described one by one here. By using these algorithms, a display policy for a page can be updated. A direction of the update is to enable the displayed page layout to obtain more cumulative reward scores, that is, obtain a greater user satisfaction degree. The display policy obtained through this update can be used to determine the most suitable page layout for different users.

In conclusion, according to the solutions of the previous implementations, a page display policy can be learned through policy exploration and policy update in reinforcement learning without labeling. In the page display policy, the most suitable page display methods can be determined for different users. As such, a diversity of page display methods are shown, the personalized demands of users are satisfied, and the use experience of users is improved.

Figure 4:
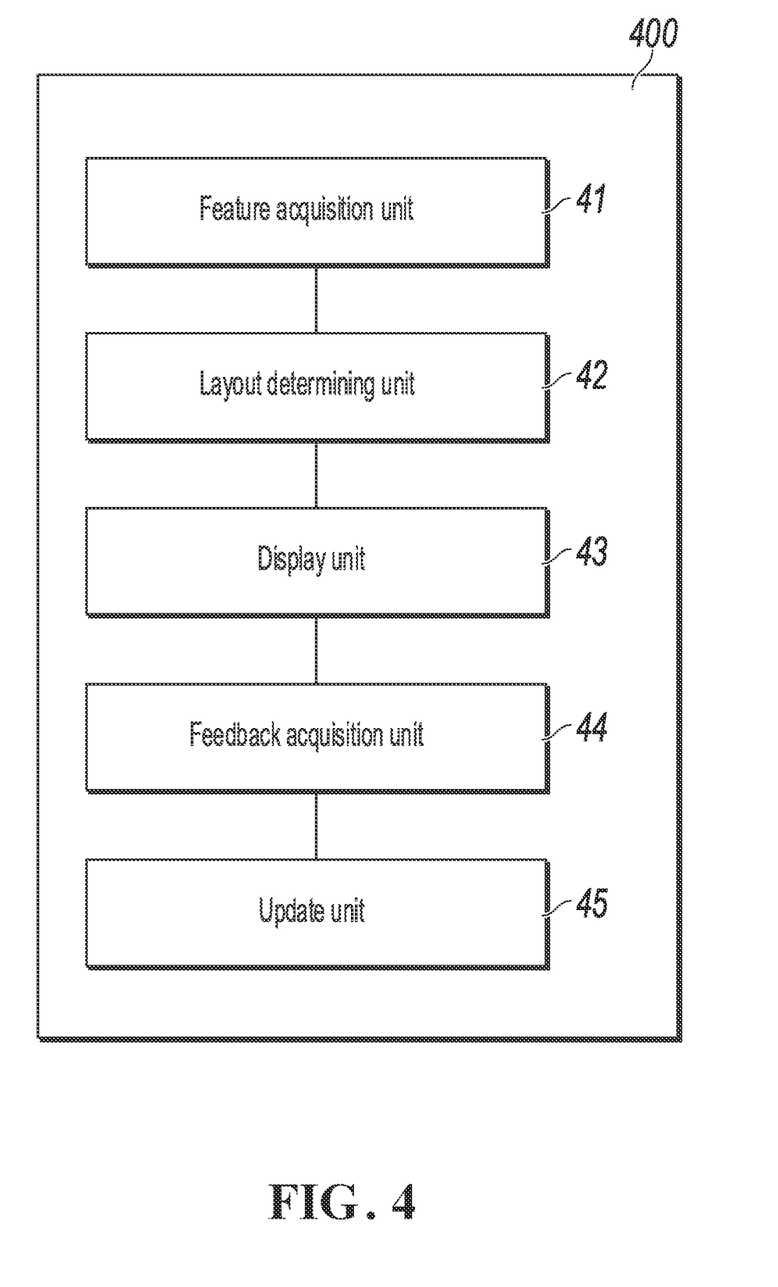
FIG. 4 is a schematic diagram illustrating an apparatus, according to an implementation.

According to an implementation of another aspect, an apparatus for displaying a page to a user through reinforcement learning is further provided. The apparatus can be deployed at any device or platform that has computing and processing capabilities. FIG. 4 is a schematic diagram illustrating an apparatus, according to an implementation. As shown in FIG. 4, the apparatus 400 includes the following: a feature acquisition unit 41, configured to obtain user features of a first user in response to a request for accessing a first page by the first user, where the user features include one or more user profile features and one or more user context features, a layout determining unit 42, configured to map, based on a display policy, the user features to a first page layout in a first plurality of candidate page layouts generated for the first page, a display unit 43, configured to display the first page to the first user with the first page layout, a feedback acquisition unit 44, configured to obtain operation information of the first user on the first page with the first page layout, and determine a reward score for current page display based on the operation information, and an update unit 45, configured to update the display policy by using a reinforcement learning algorithm based at least on the reward score to perform page display.

In an implementation, the previous user profile features include at least one of the following: age, gender, registration duration, education level, occupation, and user tag, and the user context features include at least one of the following: time when the request is sent, an interface that the request is sent through, or operation track information of the user.

According to an implementation, the previous first plurality of candidate page layouts are generated in advance in the following way: determining candidate page display methods, determining a candidate method of arranging page elements on the first page, determining candidate attributes of the page elements, and combining the page display methods, the candidate arrangement method, and the candidate attributes to generate the first plurality of candidate page layouts.

More specifically, in an implementation, the previous candidate page display methods include waterfall display and page turning display, and the previous candidate attributes include display sizes, display shapes, and resolution of the page elements.

In an implementation, the previous display policy can be an initial policy, and correspondingly, the layout determining unit 42 is configured to: randomly assign a first traffic bucket in a first plurality of traffic buckets to the first user, where the first plurality of traffic buckets correspond to the first plurality of candidate page layouts, and use a candidate page layout corresponding to the first traffic bucket as the first page layout.

In different implementations, the display policy is implemented by one of a logistic regression model, a gradient boosting decision tree GBDT model, and a deep neural network.

According to an implementation, the operation information can include at least one of the following: hit count on the page, page view, view depth to the page, and time on the page.

Correspondingly, the feedback acquisition unit 44 is configured to determine the reward score as a weighted sum of at least one of the operation information.

According to an implementation, the operation information can include a transaction amount achieved based on the first page.

Correspondingly, the feedback acquisition unit 44 can be configured to determine the reward score to be directly proportional to the transaction amount.

In an implementation, the update unit 45 is configured to: add the user features, the first page layout, and the reward score to a training sample set as one training sample and update the display policy by using the training sample set through the reinforcement learning algorithm.

According to different implementations, the reinforcement learning algorithm can include an evolution strategy algorithm, a Q-learning algorithm, a SARSA algorithm, a policy gradient algorithm, and a cross information entropy method.

The previous apparatus can provide respective suitable page layouts for different users, thereby improving user experience.

According to an implementation of another aspect, a computer-readable storage medium is further provided, a computer program is stored on the computer-readable storage medium, and when the computer program is executed in a computer, the computer performs the method described with reference to FIG. 3.

According to an implementation of the another aspect, a computing device is further provided, including a memory and a processor, where the memory stores executable code, and when executing the executable code, the processor implements the method described with reference to FIG. 3.

A person skilled in the art should be aware that in the previous one or more examples, functions described in the present disclosure can be implemented by hardware, software, firmware, or any combination thereof. When implemented by software, the previous functions can be stored in a computer-readable medium or transmitted as one or more instructions or code in the computer-readable medium.

The objectives, technical solutions, and benefits of the present disclosure are further described in detail in the previous specific implementations. It should be understood that the previous descriptions are merely specific implementations of the present disclosure, but are not intended to limit the protection scope of the present disclosure. Any modification, equivalent replacement, or improvement made based on the technical solutions of the present disclosure shall fall within the protection scope of the present disclosure.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:
1. A method comprising:
  obtaining a plurality of candidate page display methods for displaying a succession of pages;

obtaining a plurality of candidate page element arrangement methods for arranging different page elements on a same page;

obtaining a plurality of candidate attributes of the page elements;

generating, from the candidate page display methods, the candidate page element arrangement methods, and the candidate attributes of the page elements, a first plurality of candidate page layouts;

generating a display policy that defines a mapping relationship between the first plurality of candidate page layouts and a plurality of different user features;

in response to a request to access a first page by a first user, obtaining a plurality of first user features, wherein the plurality of first user features comprises one or more user profile features and one or more user context features;

selecting, according to the display policy and based on the plurality of first user features, a first page layout from the first plurality of candidate page layouts;

displaying the first page with the first page layout;

obtaining operation information of the first user interacting with the first page with the first page layout, and determining a reward score based on the operation information; and updating the display policy by implementing a reinforcement learning algorithm based at least on the reward score.

2. The method according to claim 1, wherein
the user profile features comprise at least one of the following: an age, a gender, registration duration, an education level, an occupation, or a user tag; and
the user context features comprise at least one of the following: time when the request is sent, an interface that the request is sent through, or operation track information of the first user.

3. The method according to claim 1, wherein
the candidate page display methods comprise waterfall display or page turning display; and
the plurality of candidate attributes of the page elements comprise display sizes, display shapes, or resolution of the page elements.

4. The method according to claim 1, wherein the display policy is an initial policy, and selecting the first page layout from the first plurality of candidate page layouts generated for the first page comprises:
randomly assigning a first traffic bucket in a first plurality of traffic buckets to the first user, wherein the first plurality of traffic buckets correspond to the first plurality of candidate page layouts; and
using a candidate page layout from the first plurality of candidate page layouts that corresponds to the first traffic bucket as the first page layout.

5. The method according to claim 1, wherein the display policy is implemented by one of a logistic regression model, a gradient boosting decision tree GBDT model, or a deep neural network.

6. The method according to claim 1, wherein the operation information comprises at least one of the following: hit count on the first page, first page view count, view depth to the first page, or time on the first page; and
the determining the reward score for current page display based on the operation information comprises: determining the reward score as a weighted sum of at least one of the operation information.

7. The method according to claim 1, wherein the operation information comprises a transaction amount achieved based on the first page; and
the determining the reward score for current page display based on the operation information comprises: determining the reward score to be directly proportional to the transaction amount.

8. The method according to claim 1, wherein updating the display policy for displaying pages by using the reinforcement learning algorithm based at least on the reward score to perform page display comprises:
adding the first user features, the first page layout, and the reward score to a training sample set as one training sample; and
updating the display policy for displaying the pages on the training sample set and by using the reinforcement learning algorithm.

9. The method according to claim 1, wherein the reinforcement learning algorithm comprises a SARSA algorithm, an evolution strategy algorithm, a Q-learning algorithm, a policy gradient algorithm, or a cross information entropy method.

10. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:
obtaining a plurality of candidate page display methods for displaying a succession of pages;
obtaining a plurality of candidate page element arrangement methods for arranging different page elements on a same page;
obtaining a plurality of candidate attributes of the page elements;
generating, from the candidate page display methods, the candidate page element arrangement methods, and the candidate attributes of the page elements, a first plurality of candidate page layouts;
generating a display policy that defines a mapping relationship between the first plurality of candidate page layouts and a plurality of different user features;
in response to a request to access a first page by a first user, obtaining a plurality of first user features, wherein the plurality of first user features comprises one or more user profile features and one or more user context features;
selecting, according to the display policy and based on the plurality of first user features, a first page layout from the first plurality of candidate page layouts;
displaying the first page with the first page layout;
obtaining operation information of the first user interacting with the first page with the first page layout, and determining a reward score based on the operation information; and
updating the display policy by implementing a reinforcement learning algorithm based at least on the reward score.

11. The computer-implemented system according to claim 10, wherein
the user profile features comprise at least one of the following: an age, a gender, registration duration, an education level, an occupation, or a user tag; and
the user context features comprise at least one of the following: time when the request is sent, an interface that the request is sent through, or operation track information of the first user.

12. The computer-implemented system according to claim 10, wherein
the candidate page display methods comprise waterfall display or page turning display; and
the plurality of candidate attributes of the page elements comprise display sizes, display shapes, or resolution of the page elements.

13. The computer-implemented system according to claim 10, wherein the display policy is an initial policy, and selecting the first page layout from the first plurality of candidate page layouts generated for the first page comprises:
randomly assigning a first traffic bucket in a first plurality of traffic buckets to the first user, wherein the first plurality of traffic buckets correspond to the first plurality of candidate page layouts; and
using a candidate page layout from the first plurality of candidate page layouts that corresponds to the first traffic bucket as the first page layout.

14. The computer-implemented system according to claim 10, wherein the display policy is implemented by one of a logistic regression model, a gradient boosting decision tree GBDT model, or a deep neural network.

15. The computer-implemented system according to claim 10, wherein the operation information comprises at least one of the following: hit count on the first page, first page view count, view depth to the first page, or time on the first page; and
the determining the reward score for current page display based on the operation information comprises: determining the reward score as a weighted sum of at least one of the operation information.

16. The computer-implemented system according to claim 10, wherein the operation information comprises a transaction amount achieved based on the first page; and
the determining the reward score for current page display based on the operation information comprises: determining the reward score to be directly proportional to the transaction amount.

17. The computer-implemented system according to claim 10, wherein updating the display policy for displaying pages by using the reinforcement learning algorithm based at least on the reward score to perform page display comprises:
adding the first user features, the first page layout, and the reward score to a training sample set as one training sample; and
updating the display policy for displaying pages on the training sample set and by using the reinforcement learning algorithm.

18. The computer-implemented system according to claim 10, wherein the reinforcement learning algorithm comprises an evolution strategy algorithm, a Q-learning algorithm, a SARSA algorithm, a policy gradient algorithm, or a cross information entropy method.

19. A non-transitory, computer-readable medium storing one or more instructions executable by a computer system to perform operations comprising:
obtaining a plurality of candidate page display methods for displaying a succession of pages;
obtaining a plurality of candidate page element arrangement methods for arranging different page elements on a same page;
obtaining a plurality of candidate attributes of the page elements;
generating, from the candidate page display methods, the candidate page element arrangement methods, and the candidate attributes of the page elements, a first plurality of candidate page layouts;
generating a display policy that defines a mapping relationship between the first plurality of candidate page layouts and a plurality of different user features;
in response to a request to access a first page by a first user, obtaining a plurality of first user features, wherein the plurality of first user features comprises one or more user profile features and one or more user context features;
selecting, according to the display policy and based on the plurality of first user features, a first page layout from the first plurality of candidate page layouts;
displaying the first page with the first page layout;
obtaining operation information of the first user interacting with the first page with the first page layout, and determining a reward score based on the operation information; and
updating the display policy by implementing a reinforcement learning algorithm based at least on the reward score.

* * * * *